(12) United States Patent
Halpin et al.

(10) Patent No.: US 8,959,636 B2
(45) Date of Patent: Feb. 17, 2015

(54) METHOD TO DETER SOFTWEAR TAMPERING USING INTERLINKED SUB-PROCESSES

(75) Inventors: John D. Halpin, Delran, NJ (US); Joseph P. Russell, Magnolia, NJ (US); Scott M. Sobieski, West Deptford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 2503 days.

(21) Appl. No.: 10/483,747

(22) Filed: Aug. 30, 2004

(65) Prior Publication Data

US 2013/0179967 A1   Jul. 11, 2013

(51) Int. Cl.
*G06F 21/24* (2006.01)
*G06F 21/00* (2013.01)

(52) U.S. Cl.
USPC ......... 726/23; 726/2; 726/22; 726/26; 726/27

(58) Field of Classification Search
USPC ................... 380/2, 59; 700/1, 9; 707/1, 9, 10; 710/36–51, 200, 220, 240–244; 713/150–152, 164–168, 189, 193, 194, 713/200, 201, 202; 709/213, 227–229; 726/1–23, 26–30
See application file for complete search history.

(56) References Cited

U.S. PATENT DOCUMENTS

| | | | | |
|---|---|---|---|---|
| 5,144,660 | A | * | 9/1992 | Rose ............................. 713/200 |
| 5,475,839 | A | * | 12/1995 | Watson et al. ................ 713/200 |
| 5,598,531 | A | * | 1/1997 | Hill ............................... 713/200 |
| 6,272,533 | B1 | * | 8/2001 | Browne ........................ 709/213 |

FOREIGN PATENT DOCUMENTS

WO     WO 02/079997 A1 * 10/2002 .............. G06F 12/14

* cited by examiner

*Primary Examiner* — Bernarr Gregory
(74) *Attorney, Agent, or Firm* — Howard IP Law Group PC

(57) ABSTRACT

A method is disclosed for deterring the reverse engineering of computer software code. The method involves the recognition of an unauthorized access attempt by one of a plurality of linked sub-processes embedded in the computer software code. In response to the unauthorized attempt, each of the sub-processes begins a recursive execution, resulting in computer system resources being increasingly diverted to the linked sub-processes, making it difficult to continue unauthorized attempts to access the computer software code.

3 Claims, 2 Drawing Sheets

METHOD TO DETER SOFTWEAR TAMPERING USING INTERLINKED SUB-PROCESSES

FIELD OF THE INVENTION

The present invention relates to software tampering deterrence methods, and more particularly to initiating linked sub-processes in response to an unauthorized access of computer software code.

BACKGROUND OF THE INVENTION

Anti-tamper techniques are widely needed to protect software against tampering events. These techniques can protect valuable intellectual property resident in the code and can also satisfy the Department of Defense Anti-Tamper requirements. The Department of Defense is interested in protecting critical information associated with software applications or weapon systems from exploitation by foreign adversaries. In the commercial world, there are major incentives to develop methods for protecting software applications and other digital media from piracy. Without protection, computer software code is susceptible to attack from malicious users.

There are techniques currently available to prevent tampering or reverse engineering of computer software code. Reverse engineering typically utilizes debugger or other software analysis tools. Prevention of the use of these tools is paramount in deterring unauthorized access. These techniques are generally associated with software protection that utilizes passive schemes, such as encryption or obfuscation. These passive techniques do not prevent the use of malicious tools. Furthermore, these passive techniques can oftentimes be overcome through lengthy, time-consuming processes that can break through the encryption or obfuscation and gain access to the computer software code.

Accordingly, there is a need for anti-tamper techniques that can prevent the use of tools that can facilitate unauthorized access of computer software code.

BRIEF DESCRIPTION OF THE DRAWINGS

A more complete understanding of the present invention may be obtained from consideration of the following description in conjunction with the drawings in which.

SUMMARY OF THE INVENTION

The present invention teaches a method to deter reverse engineering of computer software code. The disclosed technique changes the operating characteristics of the computer system attempting access. Importantly, by executing the linked sub-processes in response to an unauthorized access attempt, it is possible to exhaust all free memory of the computer system, thereby increasing the likelihood that the tamper attempt is unsuccessful.

In an exemplary embodiment of the present invention, a plurality of sub-processes are inter-linked in the computer software code on a computer system. When an unauthorized access of the computer software code is attempted, the linked sub-processes detect the attempt and initiate a response by recursively executing all of the linked sub-processes. By executing all of the sub-processes in recursive fashion, computer system resources such as memory and processing power are increasingly diverted to the linked sub-processes, making it difficult to continue unauthorized attempts to access the computer software code.

Advantageously, the present invention also minimizes the impact on execution time line by avoiding the encryption/decryption such, the computer software code will operate more efficiently in a non-hostile environment. The present invention is a versatile and effective means at prevent unauthorized access of computer software code.

DETAILED DESCRIPTION OF THE PREFERRED EMBODIMENT

The exemplary invention is responsive to unauthorized attempts at gaining access to computer software code. Linked sub-processes are embedded in the computer software code to detect attempts and initiate execution of the sub-processes in response. It is because of the linking of sub-processes that all of the sub-processes can be executed together in response to the attempt and increasingly divert computer system resources to make continued attempts at access impractical.

Figure 1:
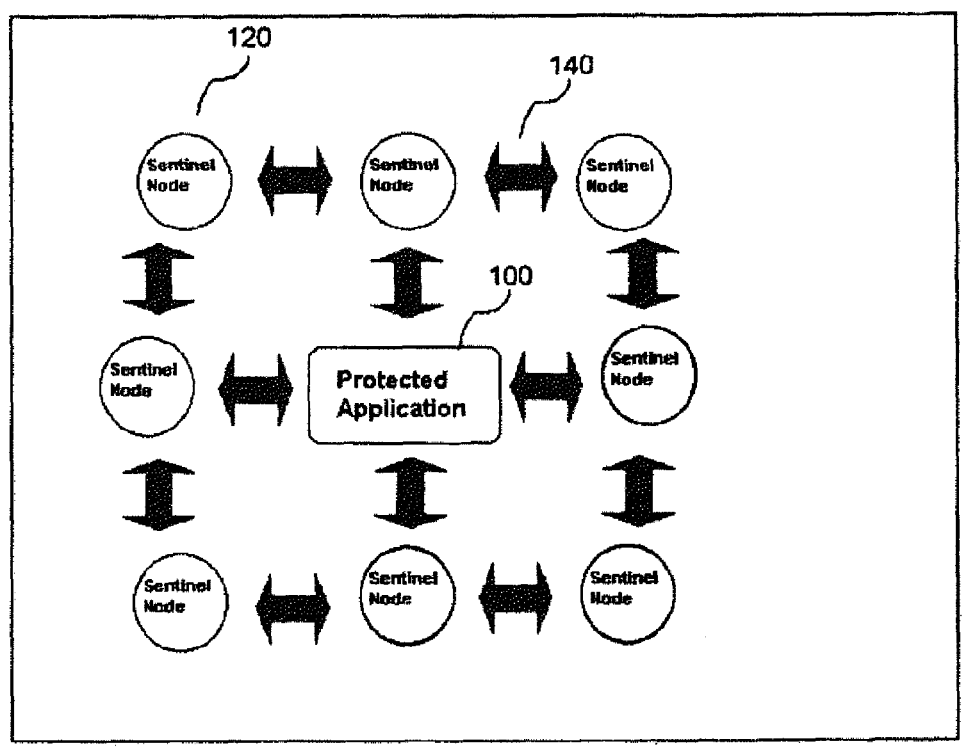
FIG. 1 is a diagram of exemplary linked sub-processes prior to an unauthorized computer software code access attempt.
Figure 2:
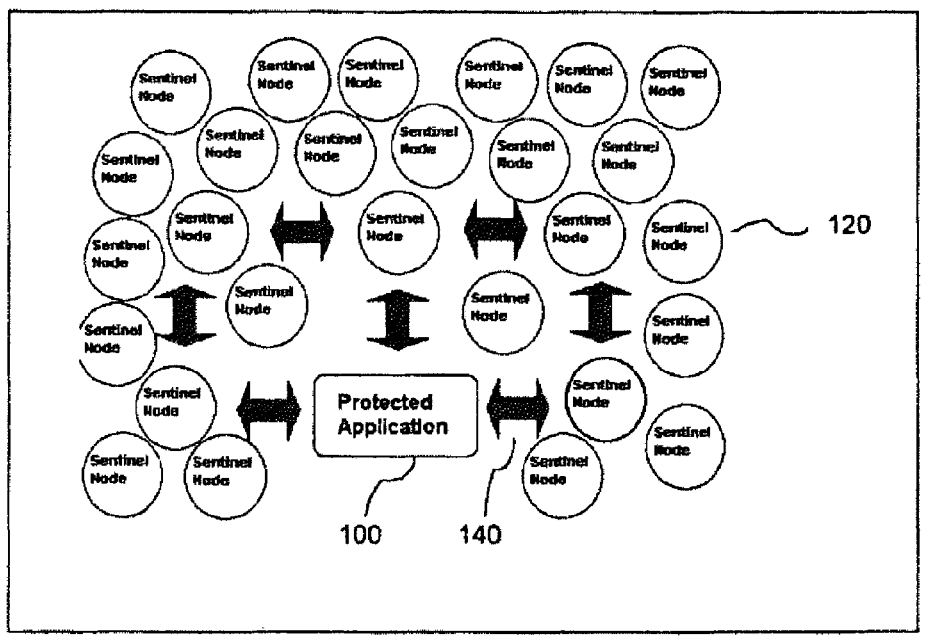
FIG. 2 is a diagram of exemplary linked sub-processes after an unauthorized computer software code access attempt.

The exemplary invention can be seen in FIG. 1. A protected application 100 consists of computer software code. Embedded in the protected application 100 are a plurality of sub-processes 120. A typical number of sub-processes 120 is eight as seen in FIG. 1 although the number can be increased depending upon the size of the protected application. Similarly, less can be used from smaller pieces of computer software code. The protected application 100 and the sub-processes 120 are connected through a set of links 140. If one of the sub-processes 120 is removed or altered, the other sub-processes 120 instantiate additional multiple sub-processes in a recursive fashion until all free memory is exhausted. The net result can be seen in FIG. 2 where the recursive execution of the sub-processes results in an increase in sub-processes 120 from eight to 27 in only a few clock cycles of the computer system. With more clock cycles and continued recursive execution, this will quickly exhaust the resources of the computer system and impede the use of any debugger or other software application analysis tools.

Each of the sub-processes or nodes can use a random link or port to communicate with the other nodes via messages on a random interval. Current prototype uses thread-based application spawning to create each sub-process or sentinel. The random message traffic keeps an attacker from being able to gain information by listening to a specific port at a specific time. When this technique is incorporated into a program application, it is injected into the executable at a binary level, with multiple entry points that check to see if the nodes are running and that no attempt to alter the executable has been made by an unauthorized source. The sub-processes or nodes are activated as a part of program startup, with each connecting to the others and verifying that the executable is unaltered.

Each sub-process or node includes a memory payload that can be specified at the time of executable compilation. The number of nodes can be determined based on program specific needs, and each node includes a sensor or series of sensors that allows it to detect when certain conditions are met and alert the program of an attack. When an attack is detected, the triggered node sends a status of its detection to all of the other nodes. Each node (including the detector) then replicates itself, eventually locking the CPU and consuming all available memory. If no attack is detected, the nodes are relatively dormant, requiring a very small percentage of CPU time. Each node can be fitted with binary code designed to crash debuggers and disassemblers, preventing this data from being located. The nodes, through the threads they execute on, will also be able to ignore halt statements from a debugger or operating system, allowing activation even while a debugger is running.

This invention is an anti-tamper (AT) technique that will deter someone from reverse engineering a protected piece of software by using multi sub-processes that are linked together within the body of code. If one of the sub-processes is removed or altered, the other sub-processes initiate additional multiple sub-processes in a recursive fashion until all free memory is exhausted. As the system is deteriorating, the application becomes more erratic which causes each execution to terminate on a different instruction, thus making the task of locating nodes difficult. If a node is located within the application and removed by an attacker, the remaining nodes will still remain active and continue replicating. In order to bypass this protection scheme, all nodes would have to be removed and all entry points would have to be deleted. This is extremely difficult and adds significant delay to the reverse engineering process.

There are limited techniques currently available for protecting software against reverse engineering. The majority of prior art associated with software protection utilizes encryption as a primary method of protection. Encryption can provide an adequate level of protection, but some applications that operate in real-time systems can not accept the impact on the execution time line due to encryption and decryption processes. The present invention, upon detecting a tamper attack, forces an attacker to stop working in the current environment and reboot the system. By running the software protection in the background through sub-process, the impact on program execution is minimized. An exemplary sub-process is a sentinel process that is an executable that examines another executable for undesirable behavior and takes an action. That action can be automatic or a report to an administrator.

The other novel feature of this invention is that it utilizes a self-replicating feature. If a tamper attack is detected, the sentinel process continuously replicates itself until all memory is used up in order to thwart an exploitation attack. Few applications use self-replicating processes; usually self-replication is limited to viruses. A virus is a self-executing process that resides on a system. It rapidly duplicates itself and can destroy data on an infected system. The replication process typically involves inserting binary code within an executable. An example would be that the virus code inserts itself at the beginning of the executable, and marks the first true line of code. It then executes its own instructions and when finished, it returns to the true program. Typically, this is a fast process, allowing the virus to spread without the user being aware of any activity. While some system administration tools use virus-like behavior to repair damaged software, no other real uses of self-replicating executables are known.

By denying a malicious user access to advanced tools, it increases the time it takes to understand and exploit code. The approach embodied by this invention is not obvious in that memory leaks from over instantiation are usually considered a flaw and not a benefit. However, if you factor in the requirement of providing protection to software applications, the utility of the present invention is that an attacker's task is made increasingly more difficult. The impact on execution time line is also minimized by avoiding the encryption and decryption processes. The security issues associated with storing cryptographic keys is also avoided with this technique. Encrypted code is generally protected in a static or non-execution environment. When an executable is activated, the processor uses the encryption algorithm to decode the executable and run it normally. An exploiter can look at the data and analyze the execution of the unencrypted binary and gain an understanding of the flow of execution via debuggers and other tools. The advantage of the present invention is that the image is protected in a run-time environment, preventing dynamic analysis of the application by causing strange behavior and forcing program halts.

The exemplary method for deterring software tampering solves the problem of preventing the use of tools that can be used in reverse engineering computer software code. As such, it has many potential applications where anti-tampering is attempted and can be used in conjunction with other existing techniques to provide more layers of protection. In addition, it can be used when the tampering computer systems are networked. Here, one computer system may be using tools on computer software code resident on another networked computer system. The present invention would then initiate the recursive executions on both computers, making it difficult for each to continue in its efforts. Indeed, any situation where unauthorized access of computer software code is attempted can benefit from the present invention.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

The invention claimed is:

1. A method to deter tampering with software code on a computer system comprising the steps of:
   connecting a plurality of linked sub-processes to said software code; and
   recognizing with said plurality of linked sub-processes an unauthorized attempt to access one of said plurality of linked sub-processes; and
   initiating a recursive execution of said plurality of linked sub-processes in response to said unauthorized attempt.

2. The method according to claim 1, wherein said recursive execution replicates said plurality of linked sub-processes.

3. The method according to claim 2, in which the initiating step includes the steps of:
   setting a tamper attempt status in said one of a plurality of linked sub-processes in response to said unauthorized attempt;
   communicating said tamper attempt status to said plurality of linked sub-processes; and
   executing recursively said plurality of linked sub-processes in response to said communication step.

* * * * *